Patented June 18, 1940

2,204,956

UNITED STATES PATENT OFFICE 2,204,956

PURIFICATION OF KETONES AND KETOLS

Fritz Bresler, Berkeley, and Albert Drasky, Oakland, Calif., assignors to Shell Development Company, San Francisco, Calif., a corporation of Delaware No Drawing. Application February 4, 1939, Serial No. 254,690

5 Claims. (Cl. 202—57)

This invention relates to a process for the purification of ketones and ketols. More particularly, the invention is concerned with the purification and decolorization to a substantially water-white material mixtures of ketones and/or ketols with neutral organic compounds contaminated with colored impurities which appear to be oxidation products of the ketones and ketols.

An object of the present invention is to provide a simple and efficient process for the removal of color-imparting impurities which frequently contaminate ketones, ketols and mixtures thereof with other neutral organic compounds. Another object of the invention is to provide a method of purification which is highly effective and is very economical in that it is simple and easy to operate and makes use of a readily available and quite inexpensive reagent.

We have found that ketones which are discolored by the presence of small amounts of color-imparting contaminants, presumably oxidation products, may be made substantially water-white by adding ammonia to the discolored ketone, allowing the mixture to stand until substantially decolorized, and then distilling to separate the resultant water-white ketone from the ammonia and any high boiling products formed during the treatment. By this means the ketone obtained as a distillate is a clear water-white material suitable for many uses not possible when it was discolored by the presence of the colored impurities.

Ketones and ketols have long been recognized as valuable substances for many industrial purposes. For these purposes it has been usually necessary that they meet very exacting specifications one of which is that they be water-white and free of coloring matter. Ketones and ketols are ordinarily very stable materials but when they are subjected to some conditions they may oxidize to a certain extent so that they will contain small amounts of colored impurities which are diketones. The development of these colored impurities usually make the ketones and ketols unsuitable for many purposes for which they are intended. Prior to the present invention no satisfactory commercially applicable method was known for purifying ketones and ketols contaminated with colored impurities. The colored impurities appear to have approximately the same boiling point as the ketones and ketols from which they are derived, and the impurities also have a very high coloring power, so that distillation and the known methods of purification are ineffective to free the ketones and ketols of the coloring matter and make them water-white.

An illustration of one of the ways by which colored impurities develop in ketones is shown in the following. The various solvents are allowed to evaporate into the air from a coating composition applied to material and the solvents which are somewhat expensive, are recovered from the air by means of an adsorptive charcoal recovery system. The recovered solvents are used again to manufacture more coating compositions and are not lost in the process. When solvents containing ketones are used in this manner, they may acquire a greenish to yellow color which makes them unsuitable for use in the coating composition. The color may be due to the formation of small amounts of oxidation products by the air acting on the ketones when they are in the presence of the charcoal, it being quite likely that the charcoal acts as a catalyst for the oxidation of the ketones. Previously, when the solvents containing ketones became discolored by the impurities, they had to be discarded because the known purification processes, such as distillation, were not effective in removing the color-imparting impurities.

A preferred mode of executing the process of the invention involves the addition of ammonia to the discolored material to be purified and rendered colorless. The ammonia appears to react with the color-imparting impurities and convert them to comparatively high-boiling reaction products which may be separated from the thus treated material to yield a water-white material. If desired, primary amines may be used in lieu of or together with ammonia. Secondary, tertiary and quaternary amines are not effective in producing the desired results. Representative primary amines which are suitable for use in the process are mono-amines such as ethyl amine, propyl amine, butyl amine, amyl amine, allyl amine, methallyl amine, crotyl amine, benzyl amine, and diamines such as ethylene diamine, propylene diamine, butylene diamine, trimethylene diamine, tetramethylene diamine, pentamethylene diamine, o-diaminocyclohexane, o-phenylene diamine, 1,2,3-toluylene diamine, 1,3,4-toluylene diamine, 1,2,3,4-xylene diamine, 1,2,4,5-xylene diamine, 1,3,4,5-xylene diamine, and the like as well as their analogues and suitable substitution products.

The treatment of the discolored materials with ammonia or primary amines does not destroy or harm the ketones, ketols or any of the other neutral compounds which may be present in the material treated. The action of the ammonia or primary amine appears to be specific to the colored impurities, and there is substantially no reaction with the other compounds which make up the material to be purified. For this reason, the process is particularly suitable for removing the colored impurities because it enables a high yield of purified material to be obtained with a minimum of treatment.

Any ketone and ketol containing colored oxidation products may be purified by the process. The term "ketone" refers to such compounds as acetone, methyl ethyl ketone, methyl propyl ketone, diethyl ketone, methyl butyl ketone, methyl isobutyl ketone, mesityl oxide, cyclopentanone, cyclohexanone, acetophenone, propionylphenone, benzophenone and the like. The term "ketol" refers to compounds such as acetyl carbinol, propionyl carbinol, butyryl carbinol, acetoin, propionoin, butyroin, isobutyroin, pivaloin, hydracetal acetone, hydracetal ethyl methyl ketone, diacetone alcohol, acetopropyl alcohol, acetobutyl alcohol, benzoyl carbinol, benzoyl ethyl carbinol, benzoyl propyl carbinol, benzoyl butyl carbinol, and the like. Removal of the colored impurities may also be effected from ketones and ketols mixed with one or a plurality of a wide variety of neutral organic compounds including alcohols such as methyl alcohol, ethyl alcohol, normal propyl alcohol, isopropyl alcohol, normal butyl alcohol, isobutyl alcohol, secondary butyl alcohol, tertiary butyl alcohol, the amyl alcohols, the hexyl alcohols, etc.; esters such as methyl acetate, ethyl acetate, isopropyl acetate, normal butyl acetate, secondary butyl acetate, isobutyl acetate, the amyl acetates, methyl propionate, ethyl butyrate, ethyl isobutyrate, etc.; ethers such as diethyl ether, diisopropyl ether, the dibutyl ethers, the diamyl ethers, diallyl ether, dimethallyl ether, ethyl isopropyl ether, propyl butyl ethers, isopropyl tertiary butyl ether, secondary butyl tertiary butyl ether, allyl isopropyl ether, ethyl methallyl ether, etc.; hydrocarbons such as pentane, hexane, heptane, isooctane, diisobutylene, octene, benzene, toluene, xylene, naphtha, gasoline fractions, hydrogenated naphtha, petroleum diluents, aromatic petroleum diluents, etc.; halogenated hydrocarbons such as carbon tetrachloride, chloroform, ethylene dichloride, propylene dichloride, butylene dichloride, ethylene dibromide, trichlorethylene, phenyl chloride, etc., and water as well as homologues, analogues and suitable substitution products of these substances.

The ammonia or primary amine may be added to the material to be treated in any form desired. It is generally preferable from an economic standpoint to use ammonia and to add it as ordinary aqueous ammonia since in this form it is usually cheap and readily available. However, an aqueous primary amine may be added or substantially anhydrous ammonia or primary amine may be introduced, as well as solutions of these substances in other suitable solvents, if desired. Another suitable mode of operation is to add ammonia or primary amine salts to the solvent to be treated and then introduce a strong base into the mixture so that ammonia or the primary amine will be liberated from the salt.

The preferred amount of ammonia or primary amine to be added to the material contaminated with colored impurities will depend not only upon the amount of impurities present but also upon the procedure and conditions used for the treatment. Experience has shown that when the material has a greenish cast only comparatively minute amounts of impurities are present while a more yellow color is evidence of the presence of more appreciable quantities and consequently more ammonia or primary amine should be used in the latter case than the former. After the addition of the ammonia or primary amine, the disappearance of the yellow or greenish color indicates that the reaction involving the impurities is substantially complete. Vigorous agitation of the mixture, or the addition of considerable excess of the ammonia or primary amine, in general decreases the time of treatment necessary. Of the two methods for decreasing the time of treatment, good agitation is preferable principally because it is the most effective, provided there is a small excess of ammonia or primary amine present. Adequate time must be allowed to elapse, however, for the action of the ammonia or amine on the color-imparting impurities to be substantially complete before distillation is started. If insufficient time is allowed so that some colored impurities still remain unaffected, these unchanged impurities may pass over with the distillate and a water-white distillate may not be obtained. When a considerable length of time passes after the disappearance of the greenish or yellow color, the treated material may turn brown, but this does not hinder the process or lead to poor results since the distillate obtained even in this case will be water-white.

The treatment of the contaminated material with the ammonia or primary amine may be made at about room temperature or any temperature up to the boiling temperature of the material being treated. Temperatures lower than room temperatures may be used if desired, but temperatures at or near room temperatures are usually preferable. Since ammonia and the lower primary amines are quite volatile, superatmospheric pressures may be used to maintain them in the material to which they are added. This is especially suitable when temperatures higher than room temperature are used.

The following is a preferred mode of executing the process.

The material discolored by the presence of impurities from the oxidation of ketones or ketols is introduced into a suitable vessel fitted with an agitating device and connected to a fractionating column. Aqueous ammonia solution is added to the material and the mixture is agitated vigorously until it is no longer colored greenish or yellow by the impurity. The mixture may then be heated and the material distilled from the mixture as a water-white material free of colored impurities. In most cases, a solid material, which may be the reaction product of the color-imparting impurities with the ammonia or amine, remains in the reaction vessel or still as bottoms.

While distillation is the preferred method of separating the ketones, ketols and mixtures thereof with other substances from the treated mixture, any other method may be used if desired. For example, separation may be accomplished by means of azeotropic distillation, extraction, filtration, centrifugation and the like.

Any suitable temperature and pressure may be used during separation of the solid reaction products from the materials being treated, depending upon the method of separation utilized and the properties of the materials. When distillation is used for separation, operation under sub-atmospheric pressure obviates the necessity of heating the material up to the normal boiling temperature. On the other hand, superatmospheric pressures are useful for distillation of low boiling liquids.

The process is adaptable to batch, intermittent or continuous operation. A batchwise mode of operation was set forth above wherein both the reaction with the ammonia and the separation of the solid material from the treated liquid material were described as taking place in the same vessel. Separate vessels may be used if desired or the ammonia or primary amine may be continuously added to the material to be treated which is being fed into one or a plurality of reaction stages at approximately the same rate that treated material is being withdrawn therefrom. The separation of the purified material from the reaction mixture may also be done continuously. For example, the treated material from the reaction stages may be passed continuously into the separating stage such as a fractionating column.

The following examples are given for the purpose of illustrating a few details of the process.

Example 1

About 0.4 cc. of commercial aqueous ammonia solution which contained approximately 26 percent $NH_3$ was added to about 100 cc. of greenish colored methyl ethyl ketone. The mixture was allowed to stand for two hours at room temperature, and was then distilled. The distillate which was separated into five fractions was clear and water-white.

In order to obtain a measure of the amount of colored impurities present in materials, the materials were tested with a Pulfrich Photometer using a 30 mm. cell and with $\lambda=430$ m$\mu$. This instrument gives a transmission value of 100 percent for water-white materials while lower values indicate increasing amounts of colored impurities.

The results obtained when the various cuts were tested are tabulated below.

| Fraction No | 1 | 2 | 3 | 4 | 5 |
|---|---|---|---|---|---|
| Weight percent of still charge | 20.2 | 19.7 | 19.8 | 19.1 | 9.7 |
| Transmission value in percent | 100 | 100 | 100 | 100 | 100 |

To compare the treated methyl ethyl ketone with that which had not been treated with ammonia, about 100 cc. of methyl ethyl ketone, taken from the same source as the treated material, was distilled in the same still into approximately equivalent fractions as those of the ammonia-treated methyl ethyl ketone and a determination was made of the transmission value for each fraction. Each fraction of the distillate in this case was colored green.

| Fraction No | 1 | 2 | 3 | 4 | 5 |
|---|---|---|---|---|---|
| Weight percent of still charge | 20.6 | 20.4 | 20.5 | 21.2 | 7.7 |
| Transmission value in percent | 60.0 | 51.0 | 45.0 | 39.0 | 33.0 |

Example II

A sample of material consisting of approximately 20% methyl ethyl ketone and 80% benzene was obtained from a process which used a charcoal recovery system for recovering solvent evaporating from an applied coating composition. This sample was dark yellow in color and contained a considerable amount of color-imparting impurities. About 200 cc. of the material was added to 500 cc. of water and the mixture shaken. After settling, about 180 cc. of upper layer was removed and the freedom from color of the lower layer indicated that practically all of the impurity was contained in the upper layer. The upper layer was split into two portions and aqueous ammonia solution was added in the amount of 0.65 cc. per 100 cc. of upper layer. The mixture containing the ammonia was allowed to stand at about 30° C. for two hours, and was then distilled. The distillate was collected in five fractions and the transmission value determined for each fraction with the following results:

| Fraction No | 1 | 2 | 3 | 4 | 5 |
|---|---|---|---|---|---|
| Weight percent of still charge | 11.1 | 26.3 | 14.2 | 27.1 | 13.4 |
| Transmission value in percent | 100 | 100 | 100 | 100 | 49 |

All the fractions were water-white except the last, No. 5, which was pale green indicating that insufficient time had been allowed and/or not a great enough excess of ammonia had been used.

Example III

To the second half of the upper layer described in Example II there was added aqueous ammonia in the amount of 1.2 cc. per 100 cc. of upper layer. The liquid turned water-white in a few minutes after addition of the ammonia and distillation was started immediately. The distillate was separated into three fractions and the transmission value of each fraction determined. The results obtained in the experiment are listed below.

| Fraction No | 1 | 2 | 3 |
|---|---|---|---|
| Weight percent of still charge | 20.8 | 33.6 | 34.9 |
| Transmission value in percent | 100 | 100 | 100 |

Each of the fractions was water-white.

Although we have hereinbefore disclosed our invention with certain specific embodiments and variants thereof, it is to be understood that the invention is intended to be limited only by the scope of the appended claims.

We claim as our invention:

1. A process for the purification of methyl ethyl ketone which is contaminated and discolored by the presence of color-imparting diketone impurities in the nature of ketone oxidation products, which comprises contacting the liquid discolored ketone with an aqueous ammonia solution until the ketone is substantially water-white, and separating the purified methyl ethyl ketone from the mixture.

2. A process for the purification and decolorization of methyl ethyl ketone which is discolored by the presence of color-imparting diketone impurities in the nature of ketone oxidation products, which comprises contacting the discolored ketone with an effective amount of an aqueous ammonia solution until the action of the ammonia on the color-imparting impurities is substantially complete, and distilling the mixture to separate the purified and substantially water-white methyl ethyl ketone.

3. A process for the purification and decolorization of an aliphatic ketone which is discolored by the presence of color-imparting diketone impurities in the nature of ketone oxidation products, which comprises treating the discolored ketone with ammonia until the ketone is substantially decolorized, and recovering the purified and substantially water-white ketone.

4. A process for the purification and decoloration of a ketone which is discolored by the presence of color-imparting diketone impurities in the nature of ketone oxidation products, which comprises treating the discolored ketone with a compound of the group consisting of ammonia and the primary amines until the treated mixture is substantially water-white.

5. A process for the decolorization of substances of the group consisting of ketones and ketols which are discolored by the presence of color-imparting diketone impurities in the nature of oxidation products of said substances, which comprises reacting the discolored substance with a compound of the group consisting of ammonia and primary amines until said discolored substance is substantially water-white.

FRITZ BRESLER.
ALBERT DRASKY.